May 30, 1967

O. FISCHER 3,322,049

PHOTOGRAPHIC CAMERA WITH EXPOSURE FACTOR CONNECTION
MEANS CONTROLLED BY RESETTING OF CAMERA

Filed Sept. 25, 1963

May 30, 1967 O. FISCHER 3,322,049
PHOTOGRAPHIC CAMERA WITH EXPOSURE FACTOR CONNECTION
MEANS CONTROLLED BY RESETTING OF CAMERA
Filed Sept. 25, 1963 2 Sheets-Sheet 2

United States Patent Office 3,322,049
Patented May 30, 1967

3,322,049
PHOTOGRAPHIC CAMERA WITH EXPOSURE FACTOR CONNECTION MEANS CONTROLLED BY RESETTING OF CAMERA
Oskar Fischer, Braunschweig-Volkmarode, Germany, assignor to Voigtlander A.G., Braunschweig, Germany, a corporation of Germany
Filed Sept. 25, 1963, Ser. No. 311,477
Claims priority, application Germany, Sept. 28, 1962, V 23,090
3 Claims. (Cl. 95—10)

This invention relates to photographic cameras provided with electric exposure meters, means for setting the exposure value in accordance with the indication of the exposure meter, and additional means for correcting or adjusting the setting of the exposure value. More particularly, the present invention is directed to a photographic camera of this type in which the additional correction is automatically maintained during taking of an exposure and is automatically cancelled response to re-setting the camera for a subsequent exposure.

Cameras of the type to which the present invention is directed have means whereby the exposure value set in correspondence with the indication of an exposure meter may be modified or corrected. Such a correction is desirable or necessary if the exposure conditions are unusual. For example, the correction may be needed if the picture is taken in the presence of heavy clouds, at twilight, against the light, or with scenes having extreme differences in brightness, or if the picture is to be deliberately overexposed or underexposed. The correction is effected by increasing or decreasing either the exposure time or the diaphragm aperture from the value set in accordance with the indication of the exposure meter.

Such correcting devices are particularly desirable in so-called automatic cameras in which the exposure value is set when the shutter is released and without any manual actuation by the user, as the field of application of such automatic cameras is substantially increased by the provision of such a correcting device therein.

It is known to effect such a correction by adjusting the setting means for the film sensitivity to a value different from the correct value. However, in this case, the film sensitivity setting has to be readjusted manually when pictures are to be taken without any correction of the setting for film sensitivity. Such manual cancellation is also necessary if a correction device is provided solely for applying a correction factor.

The necessity of changing the corrected setting, when taking a subsequent photograph, is eliminated in another known type of camera which is provided with means for setting correction factors into the mechanism which otherwise sets the exposure time automatically. In this camera, the correction means is controlled by spring means which attempts to bias the correction device to the zero or neutral position. If it is desired to apply a correction factor to an exposure setting, the correction device must be held in its operative position against the force of the spring means while the picture is being taken. After the correction device is released, it is returned automatically to its zero or neutral position. The additional operation, necessary while the picture is being taken, reduces the ease of handling the camera and requires additional manual operations which detract from the observation of the object being photographed just at the instant of exposure.

In accordance with the present invention, a photographic camera having a correction device is provided with correction device control means which is coupled with the camera operating mechanism in such a manner that the correction device is automatically returned to its zero position as a result of movements of the camera mechanism which occur naturally between two successive exposures.

More particularly, the control means for the correction device releasably automatically latches the correction device in any set position of the latter corresponding to a given correction factor. The control means is coupled with the camera operating or re-setting mechanism and is moved, by operation of the re-setting mechanism normally occurring between two consecutive exposures, into a position where it releases the correcting device for the automatic spring biased return of the latter to the zero or neutral position. Preferably, the latching means is a ratchet type device in which a spring biased pawl is coupled with the camera mechanism and is retracted from engagement with the ratchet teeth for a short interval by operation of the camera setting mechanism in preparing for another exposure. This permits the correction device to be returned to the zero position automatically under the influence of the spring biasing means associated therewith.

Release of the latching means can be effected either as a result of the operation of the shutter release button or as a result of the operation of the film advancing lever.

For an understanding of the principles of the invention, reference is made to the following description of typical embodiments thereof as illustrated in the accompanying drawings. In the drawings.

Solely by way of example, the invention will be described as applied to a reflex camera of the single-eye operation type, but it will be understood that the principles of the invention may be easily applied to other types of cameras.

Figure 1:
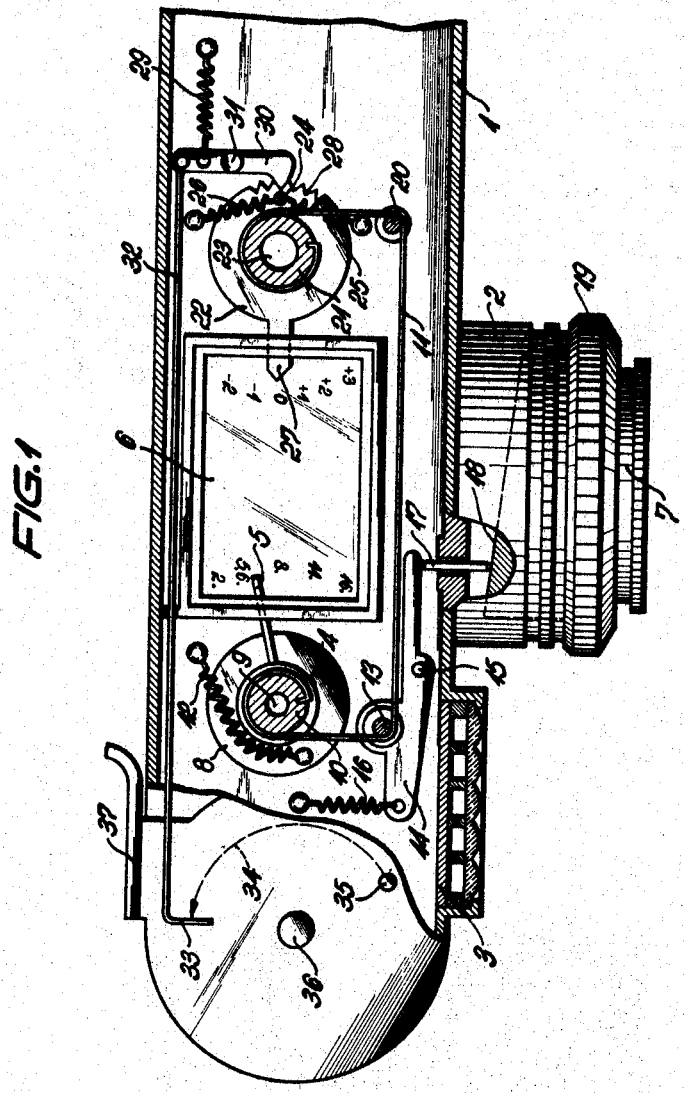
FIG. 1 is a top plan view, partly in section, of a camera incorporating one embodiment of the invention.

Referring to FIG. 1, a camera casing or housing 1 is provided with a mounting 2 for an objective having a central shutter. A light sensitive cell 3 of an electric exposure meter is mounted in casing 1 and is connected by wiring (not shown) with a meter movement 4 including a pointer 5 extending over a ground glass plate 6 forming part of the viewfinder for viewing the image of the object to be photographed as projected by an objective 7.

Movement 4 is mounted on a carrier 8 which is rotatable on casing 1 about the axis of a shaft 9 which is coaxial with the axis of the movement. A pulley 10 is rigidly connected to carrier 8 and one end of a cord 11 is secured to pulley 10. A tension spring 12 has one end fastened to carrier 8 and the other end secured to housing 1. Cord 11 extends from pulley 10 over a guide pulley 13 supported on a lever 14 pivotally attached to casing 1 by a pivot pin 15. A tension spring 16 is connected between one end of lever 14 and a fixed point on housing 1, and biases lever 14 in such a direction that the other end of the lever continuously engages a pin 17 to press the latter against a control cam 18 connected to a ring 19 for setting the exposure time.

Cord 11 extends over a second pulley 20 to a pulley 21 to which it has its other end attached. Pulley 21 is fixed to an indicator disk 22, and pulley 21 and disk 22 are coaxially secured to a shaft 23 extending from casing 1 and carrying an adjusting button such as the button 38 of FIG. 2. Two opposing and equal tension springs 25 and 26 have their outer ends connected to casing 1 and their inner ends connected to a pin 24 mounted on indicator disk 22. Springs 25 and 26 are so positioned and dimensioned that they bias indicator disk 22 into a position in which its pointer 27, which extends into the viewing area of the viewfinder in the same manner as does the pointer 5 of the exposure meter, points to the zero mark of a scale on ground glass plate 6. The scale divisions, beginning with zero in the center indicate an increase (+) of the exposure time in one direction and a decrease (−) of the exposure value in the other direction.

The circular indicator disk 22 is formed with ratchet teeth 28 which are engaged by a ratchet lever or pawl 30 pivoted on a pin 31 and biased into engagement with teeth 28 by a tension spring 29 secured to lever 30 and to casing 1. A link or pull rod 32 is attached to pawl 30, and is movable relative to casing 1. Pull rod 32 has a bent end 33 which extends into the path of movement, as indicated by an arrow 34, of a finger 35 supported by film advancing lever 37 which is pivoted on support 36.

The arrangement just described operates as follows: Pointer 5 of the exposure meter is deflected in proportion to the amount of light falling on cell 3. The visible indicator reading is affected by the exposure time setting which determines, through cam 18 and pin 17, the position of lever 14 and thus of guide pulley 13. As a result, carrier 8 for meter movement 4 is shifted by means of cord 11 with the cooperation of spring 12. The aperture reading indicated by pointer 5 on its scale may be transferred, either manually or by means of an automatic sensing means of a known type, to the diaphragm adjusting means of the objective.

Special exposure conditions, such as heavy cloud cover, twilight, subjects with extreme differences in brightness, or intentional overexposure or underexposure make it necessary, as is known to those skilled in the art, to enter a suitable correction in the setting of the camera as given by the reading of the exposure meter. With the arrangement shown, this is effected by turning adjusting button 38 (FIG. 2) which carries a mark moving along a scale corresponding to that of pointer 27 of FIG. 1. By angularly adjusting button 38, indicator disk 22 and pulley 21 are turned against the resistance of ratchet device 28, 30. Carrier 8 with meter movement 4 is thus rotated by cord 11, which changes the exposure meter reading on which the camera setting has been based. There is now a difference in the tensions of springs 25 and 26, and that difference is maintained by means of ratchet device 28–30. Thus, any selected correction factor will now be entered as an increase or decrease into the exposure time if a picture is taken.

In the particular examples shown in FIG. 1, pointer 5 points approximately to the aperture "5.6." Thus, this diaphragm aperture would be automatically set if an exposure is made with the time setting chosen while the prevailing light conditions last, such as by means of a device sensing the position of pointer 5 before the shutter is released. If a correction is made by means of button 38, for example to the scale value "−1" of indicator 27, meter 4 is moved in such a manner that its indicator 5 will now point to the aperture value "8," which is then set by the automatic sensing device.

As the film is advanced after an exposure is made, pin 35 on film advance lever 37 contacts bent end 33 of pull rod 32 moving this rod to the left as viewed in FIG. 1. This disengages ratchet 28–30, and springs 25 and 26 return to their position of equilibrium and, in so doing, move the correction device back into the zero or neutral position shown in the drawing.

Figure 2:
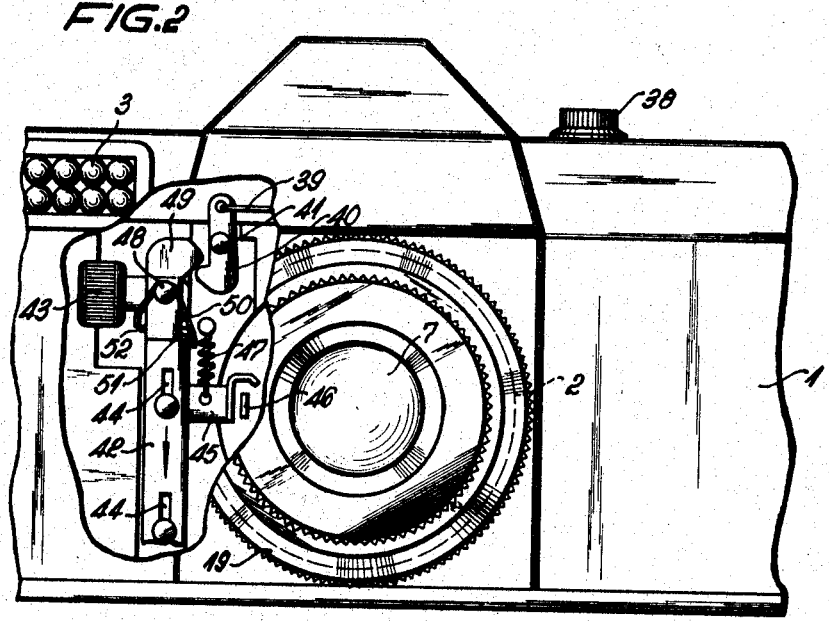
FIG. 2 is a front elevational view, partly in section, of a camera incorporating another embodiment of the invention.
Figure 3:
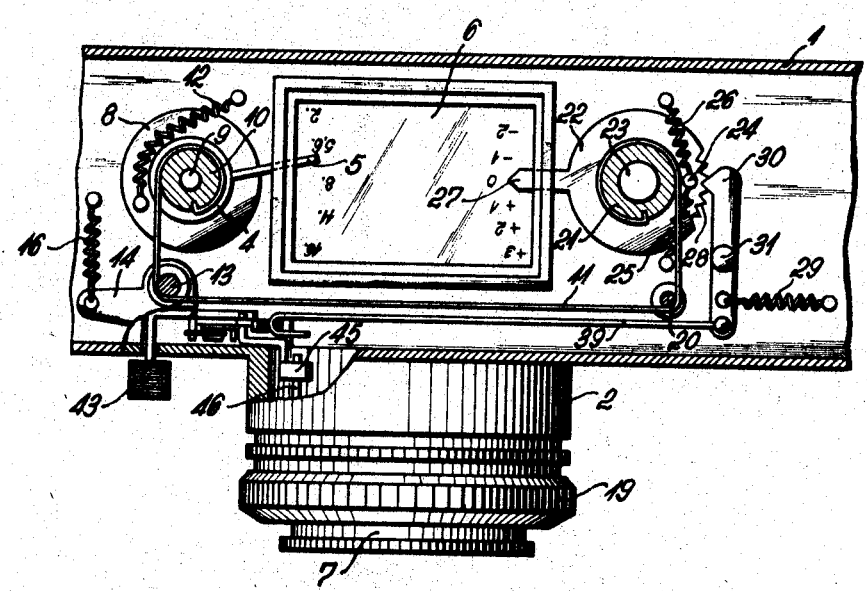
FIG. 3 is a top plan view, partly in section, of the camera shown in FIG. 2.

The camera shown in FIGS. 2 and 3 differs from that of FIG. 1 only in that the automatic return of the correction device to the zero position is effected by the movement of the shutter release instead of by the advance of the film. The location of the exposure meter, and the type, design and operation of the correction device are the same as in FIG. 1. Thus, the components in FIGS. 2 and 3 corresponding to those in FIG. 1, have been given the same reference numerals as in FIG. 1, and it is believed that a repeated description is unnecessary.

The arrangement of FIGS. 2 and 3 differs from FIG. 1 in that a connecting rod 39 is secured to pawl 30, and the other end of rod 39 is connected to a lever 40 pivotal on a support 41 on casing 1. A shutter release slide 42 is slidably mounted on the front of the casing by means of a pinslot guide 44, and is operated by an actuating button 43 projecting from casing 1. Slide 43 carries an angularly bent arm 45 cooperable with the shutter release 46. A tension spring 47 is connected between arm 45 and a fixed point on the casing and holds slide 42 in the neutral position shown in FIG. 2.

A latch 49, which is pivoted on a pin or the like 48, is mounted on release slide 42, and a weak hairpin spring 50, secured to pin 48, has one of its ends overlapping a lug 51 bent from latch 49. Spring 50 tends to rotate latch 49 clockwise and to maintain it in contact with a bent lug or ear 52 of slide 42, the other end of spring 50 contacting the outer surface of lug 52. Because of this support, latch 49, when release slide 42 is moved in the direction of the arrow in order to release the shutter, swings away from lever 40 so that the latter does not change its position. During the return movement of slide 42 under the influence of spring 47, after the shutter has been released, however, lever 40 is rotated counterclockwise by latch 49 which now has the relation to slide 42 shown in FIG. 2. This causes ratchet 28–30, operable on indicator disk 22, to be momentarily released by connecting rod 39 in the same manner as described for FIG. 1. This enables indicator disk 22 to be automatically spring biased into the zero position from any correction position in which it may have been set.

While specific embodiments of the invention have been shown and described in detail to illustrate the application of the principles of the invention, it will be understood that the invention may be embodied otherwise without departing from such principles.

What is claimed is:

1. In a photographic camera, in combination, camera operating mechanism; an electric exposure meter including a meter movement having an indicator movable about an axis, said meter movement being angularly adjustable bodily about such axis; means for adjusting an exposure value in accordance with the meter indication; a correction device selectively operable from a neutral position for incorporating a correction factor into the thus adjusted exposure value; means interconnecting said correction device and said meter movement and effective, upon operation of said correction device, to adjust said meter movement angularly in accordance with the setting of said correction device; correction device control means, including coupling means interconnecting said mechanism and said device, effective, responsive to an operation of said mechanism normally occurring between successive exposures, to reset said device to its neutral position, said correction device including a disk movable therewith and having ratchet teeth; said control device including a movable pawl spring biased into engagement with said ratchet teeth; said coupling means, upon such operation of said mechanism, momentarily actuating said pawl to release said ratchet teeth; and means biasing said correction device to its neutral position, said coupling means comprising a link connected to one end of said pawl and having an abutment on its other end; said mechanism including a film advance lever and a stop movable with said lever and engageable with said abutment, when said film advance lever is operated to advance the film, momentarily to move said link to disengage said pawl from said ratchet teeth.

2. In a photographic camera, in combination, camera operating mechanism; an electric exposure meter including a meter movement having an indicator movable about an axis, said meter movement being angularly adjustable bodily about such axis; means for adjusting an exposure value in accordance with the meter indication; a correction device selectively operable from a neutral position for incorporating a correction factor into the thus adjusted exposure value; means interconnecting said correction device and said meter movement and effective, upon operation of said correction device, to adjust said meter movement angularly in accordance with the setting of said correction device; correction device control means, including coupling means interconnecting said mechanism and said device, effective, responsive to an operation of said mechanism normally occurring between successive exposures, to reset said device to its neutral position, said correction device including a disk movable therewith and having ratchet teeth; said control device including a movable pawl spring biased into engagement with said ratchet teeth; said coupling means, upon such operation of said mechanism, momentarily actuating said pawl to release said ratchet teeth; and means biasing said correction device to its neutral position, a first pulley fixed to said disk coaxially therewith; an adjusting button, included in said correction device, and operable to angularly adjust said disk and said pulley; a second pulley fixed to move with said meter movement; spring means biasing said meter movement for movement in one direction; and a cord secured to said second pulley and trained over intermediate pulleys, said cord having its opposite end secured to said first pulley.

3. In a photographic camera, the improvement claimed in claim 2, in which said biasing means comprises a pair of tension springs connected to said disk and extending in substantially opposed directions therefrom, the strength of said springs being such that their effects on said disk cancel each other in the neutral position of said disk.

References Cited

UNITED STATES PATENTS

| 3,036,507 | 5/1962 | Losser | 95—31 |
| 3,078,772 | 2/1963 | Goshima | 95—10 |
| 3,094,052 | 6/1963 | Singer | 95—10 |
| 3,103,149 | 9/1963 | Ohara | 95—10 |

FOREIGN PATENTS

| 1,305,077 | 8/1962 | France. |

JOHN M. HORAN, *Primary Examiner.*